Patented Aug. 26, 1924.

1,506,118

UNITED STATES PATENT OFFICE.

FRANCIS X. GOVERS, OF NEW YORK, N. Y.

METHOD OF PREPARING SILICEOUS MATERIAL.

No Drawing.   Application filed August 7, 1923. Serial No. 656,299.

*To all whom it may concern:*

Be it known that I, FRANCIS X. GOVERS, a citizen of the United States, residing at New York city, in the county of New York, State of New York, have invented certain new and useful Improvements in Methods of Preparing Siliceous Material; and I do hereby declare the following to be a full, clear, and exact description of the invention, such as will enable others skilled in the art to which it appertains to make and use the same.

This invention relates to the preparation of siliceous material having marked properties of adsorption. In addition to its valuable properties as an adsorptive agent, this siliceous material is useful as a catalyst and a carrier for catalytic materials and for other purposes.

In his early work Graham introduced the name "sol" to designate colloidal solutions and "gel" to indicate precipitated or coagulated colloids. In the method hereinafter described a "sol" as distinguished from a "gel" is treated in preparing adsorptive material.

Various methods of preparing colloidal silicic acid are and have been well known for many years and the literature includes disclosures of the comparative effect of various concentrations of the numerous precipitation or coagulation agents upon solutions of sodium silicate with respect to the time required to effect the production of a "gel". A common method of preparing colloidal silicic acid includes the addition of a dilute solution of hydrochloric acid to a dilute solution of sodium silicate which is stirred thoroughly during the addition of the acid to ensure the proper mingling of the reacting materials. The colloidal silicic acid produced by the reaction, according to the concentration and temperature of the solution, will be precipitated immediately or form an opalescent mixture. This mixture is a "sol" or colloidal solution and after a time interval, which is also affected by the concentration and temperature, it will set as a firm jelly-like mass or "gel". Heretofore in preparing adsorptive material a "gel" has been allowed to form before drying.

It is the object of the present invention to provide a method of preparing adsorptive silicic acid and particularly to avoid the production of a jelly-like mass of silicic acid. A further object of the invention is the provision of a method of forming mixed products including adsorptive silicic acid and other catalytic materials.

Other objects and advantages of the invention will be apparent as it is better understood by reference to the following specification in which the preferred embodiment of my invention is described.

In carrying out the invention, as an illustration, I prepare a colloidal solution of silicic acid in a well known manner, for example, by adding a solution of hydrochloric acid to a solution of sodium silicate, mingling the solutions thoroughly during the addition of the acid. The strength of the solution may vary, depending upon the desired retardation of setting so that drying may be started before a "gel" has formed. For example, a solution of sodium silicate having a density of from 1.06 to 1.12 may be treated with an equal volume of hydrochloric acid varying from 0.55 normal to 4.0 normal at a temperature varying from 0° to 100° C. The figures merely illustrate the wide range of possible practice. For practical purposes sodium silicate of 1.12 density and hydrochloric acid at 1.2 normal will produce a colloidal solution, the setting or formation of a "gel" of which is retarded from 2 to 3 hours. Other acids may be used and my invention, which does not involve the details of forming the colloidal solution, is not limited to the production thereof in any particular manner.

The colloidal solution of silicic acid prepared by any suitable method is dried before a "gel" has formed or set. This may be accomplished in any advantageous manner, for example, in a spray drier. Thus the colloidal solution is sprayed into a heated chamber wherein water is evaporated and the solids settle to the bottom of the chamber in a finely divided condition. The drying is carried out to the extent that the settled solids substantially lose their power to form a solid "gel" in contact with water, that is to say, until the colloidal silicic acid has assumed a structural form from which it will not revert. This does not necessarily involve complete drying or removal of all of the moisture present. The change in the material is one which can be readily determined by test and the drying is conducted accordingly.

The material from the drier is washed by the addition of water. This may be accomplished in a variety of ways well known in the art. Thus the material may be mixed with water which is then separated by decantation. After the impurities, including the salts formed by the reaction and any contaminating substances which were present in the sodium silicate and acid, have been removed the product is again dried, for example, in a tunnel or vacuum dryer and is ready for shipment. It may be ground to any size required for the particular purpose for which it is to be utilized.

The washing is accomplished with much more efficiency when the material is produced in the manner indicated than when it is first permitted to set and is washed thereafter. Losses are reduced and the time and quantity of water required for complete washing are materially lessened.

The product has all of the desirable characteristics of adsorptive silicic acid. I have found, moreover, that it is in a much finer state of division and that the pores are more uniformly distributed than in silicic acid as heretofore prepared. The product possesses greater adsorptive and clarifying powers and is particularly well adapted for certain uses in catalytic reactions and in the formation of catalytic bodies.

For example, if at the time of the formation of the colloidal silicic acid, iron, silver, platinum or other catalysts in colloidal form are added thereto or formed in connection therewith, a resulting mixed product is produced. If the colloidal solution is dried the product is superior to that obtained in conjunction with silicic acid which has been allowed to form into a "gel."

The method herein described is not limited in its application to the preparation of silicic acid and compounds therewith. It may be employed with like advantages in the purification and drying of other "sols," and I desire to claim the method broadly for any purpose to which it is applied.

Various changes may be made in the details of operation as hereinbefore indicated without departing from the invention or losing any of the advantages thereof.

I claim:—

1. The method of preparing silicic acid which comprises preparing a colloidal solution of silicic acid and removing water therefrom before a "gel" has formed, the removal of water being carried to the extent that the solid product will not form a solid "gel" in the presence of water.

2. The step in the method of preparing silicic acid, which comprises drying a colloidal solution of silicic acid before a "gel" has formed therefrom and to the extent that the solid product will not form a solid "gel" in the presence of water.

3. The step in the method of preparing silicic acid, which comprises spray drying a colloidal solution of silicic acid before a "gel" has formed therefrom and to the extent that the solid product will not form a solid "gel" in the presence of water.

4. The method of preparing silicic acid, which comprises preparing a colloidal solution of silicic acid, removing water therefrom before a "gel" has formed, the removal of the water being carried to the extent that the solid product will not form a solid "gel" in the presence of water, washing the product and again drying it.

5. The method of preparing silicic acid, which comprises preparing a colloidal solution of silicic acid, including a catalytic agent in colloidal form, and removing water therefrom before a "gel" has formed, the removal of the water being carried to the extent that the product will not form a solid "gel" in the presence of water.

6. The method of preparing silicic acid, which comprises preparing a colloidal solution of silicic acid, including a catalytic agent in colloidal form, removing water therefrom before a "gel" has formed, the removal of the water being carried to the extent that the product will not form a solid "gel" in the presence of water, washing the solid product and again drying it.

7. In the purification of "sols" the step of removing water from a colloidal solution before a "gel" has formed therefrom and to the extent that the solid product formed thereby will not form a solid "gel" in the presence of water.

8. In the purification of colloidal material, the step of removing water from mixed colloidal solutions before the "gel" is formed therefrom and to the extent that the solid product formed will substantially preserve its structural form in the subsequent washing.

In testimony whereof I affix my signature.

FRANCIS X. GOVERS.